(12) United States Patent  
Fuechtling

(10) Patent No.: US 8,667,770 B2  
(45) Date of Patent: Mar. 11, 2014

(54) HEADER

(75) Inventor: Christian Fuechtling, Ascheberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 295 days.

(21) Appl. No.: 13/215,335

(22) Filed: Aug. 23, 2011

(65) Prior Publication Data

US 2012/0047866 A1  Mar. 1, 2012

(30) Foreign Application Priority Data

Aug. 24, 2010 (DE) .......................... 10 2010 037 131

(51) Int. Cl.  
*A01D 43/00* (2006.01)

(52) U.S. Cl.  
USPC ................................. 56/181; 56/14.5; 56/153

(58) Field of Classification Search  
USPC .................. 56/14.5, 181, 182, 192, 15.8, 153  
See application file for complete search history.

(56) References Cited

U.S. PATENT DOCUMENTS

| 353,106 A * | 11/1886 | Williams ........................ 56/181 |
| 3,699,754 A * | 10/1972 | Koch et al. ..................... 56/15.8 |
| 3,982,383 A * | 9/1976 | Mott ............................... 56/11.6 |
| 4,956,966 A * | 9/1990 | Patterson ........................ 56/181 |
| 7,478,521 B2 | 1/2009 | Coers et al. |
| 7,640,720 B1 * | 1/2010 | Lovett et al. .................... 56/181 |

* cited by examiner

*Primary Examiner* — Alicia Torres  
(74) *Attorney, Agent, or Firm* — Michael J. Striker

(57) ABSTRACT

A header has a middle section disposed on a base frame, and at least two side sections disposed adjacent the middle section and comprising a flexible cutter bar and at least one conveyor device located downstream of the cutter bar, which, on the respective side sections, is in the form of an endless belt disposed adjacent the middle section in order to transport crop cut by the cutter bar parallel to the longitudinal axis of the header in the direction of the middle section, wherein the side sections comprise a large number of supporting arms which are pivotably mounted on the base frame, wherein the supporting arms of the particular side section carry the cutter bar, and at least one supporting element is provided which carries at least one belt, thereby enabling them to move independently of one another.

12 Claims, 5 Drawing Sheets

HEADER

CROSS-REFERENCE TO RELATED APPLICATION

The invention described and claimed hereinbelow is also described in German Patent Application DE 10 2010 037 131.9 filed on Aug. 24, 2010. This German Patent Application, whose subject matter is incorporated here by reference, provides the basis for a claim of priority of invention under 35 U.S.C. 119(a)-(d).

BACKGROUND OF THE INVENTION

The present invention relates to a header.

A header is known from U.S. Pat. No. 7,478,521 B2, which comprises a middle section disposed on a frame, and at least two side sections disposed on the frame, adjacent the middle section, which enclose a flexible cutter bar and at least one conveyor device disposed downstream of the cutter bar. On each of the side sections, the conveyor device is in the form of at least one endless belt disposed adjacent the middle section in order to transport crop cut by the cutter bar parallel to the longitudinal axis of the header in the direction of the middle section. The middle section is equipped with a belt conveyor which circulates transversely to the longitudinal axis in order to convey the crop transferred from the lateral transverse belt conveyor to a feeder housing of a combine harvester on which the header can be mounted. In the case of this header, the cutter bar and the endless belts of the side sections are carried jointly by float arms which are arranged parallel to one another, lie in a plane, and are mounted on a base frame of the header such that they can rotate about a single common pivot axis in order to enable ground contours to be compensated for via partial deflection of the header.

The disadvantage of this header is that, upon vertical deflection of one or more of the float arms, the belt is pressed in sections in the direction of the base frame because the pivot axis of the float arms is situated at a distance from the belt. The movement of the belt in the horizontal direction caused by the great distance thereof from the pivot axis results in increased wear of the belt. The partial deflection of the belt by the float arm that changes position with respect to the adjacent float arms also makes guidance of the belt difficult since the position of the belt is changed with respect to the rollers by which it is driven and guided, and which extend transversely to the pivot axis of the float arm. The partial deflection of the belt induced by the vertical deflection of one or more float arms causes the belt to become deflected in both the vertical direction and the horizontal direction, whereby the guidance of the belt in this region is negatively affected for the duration of the deflection.

SUMMARY OF THE INVENTION

The problem addressed by the invention is that of providing a header of the initially stated type, which reacts to ground contours in a flexible manner, wherein secure and low-wear guidance of the belts and optimal adaptation of the cutter bar to the ground are given.

According to the invention, the supporting arms of the particular side section carry the cutter bar, and at least one supporting element is provided which carries at least one belt, thereby enabling them to move independently of one another. By decoupling the functions of the cutter bar being carried by the supporting arms, and of the conveyor device—which is in the form of belts—being carried on the side sections, the guidance of the belt and the belt itself remain largely unimpaired in this region when one or more adjacent supporting arms undergo vertical deflection since the supporting element can move relative to the supporting arms. The supporting element is likewise deflected vertically and, along with it, the elements that drive and guide the belt. In this case, in contrast to the aforementioned prior art, the belt is deflected horizontally only slightly in order to follow the movement of the float arm.

In order to decouple the functions of the cutter bar being carried by the supporting arms, and of the conveyor device—which is in the form of belts—being carried on the side sections, the supporting arms and at least one supporting element should each be hinge-mounted on the base frame such that they can swivel about separate pivot axes. Since the pivot axes are separated, the pivot axes of the supporting arms and at least one supporting element can orient themselves freely, whereby their positioning can be optimally adapted to the particular function of the cutter bar and the belt.

The at least one supporting element can be in the form of a large number of carrier arms arranged in parallel with the supporting arms which carry the cutter bar. They can be aligned with the supporting arms in the vertical direction. Likewise, the carrier arms can also be offset relative to the supporting arms as seen in the horizontal direction of the side section.

In a preferred development, at least one supporting element can be in the form of a framework. Optimal belt guidance can be attained as a result since continuous belt contact without interruptions is ensured. Furthermore, belt guidance is improved by the framework design of the supporting element in that none of the conveyance fins provided on the surface of the belt bend in the center, because the belt rests on the supporting element, which is in the form of a framework, at nearly every point. Another advantage is that the end-face seal of the transition between cutter bar and belt is simplified.

To this end, at least two carrier arms of one side section can be interconnected by at least one crossmember. At least one crossmember can extend largely across the entire width of the side section and thereby interconnect all carrier arms of the side section. To ensure that the at least one crossmember has the flexibility required to undergo a horizontal compensatory movement, it is made of an elastic material such as plastic or rubber, for example, or is designed as a metal rail which has appropriate flexibility and is secured at only one point of the particular side section, thereby enabling the crossmember—which is in the form of a metal rail—to undergo a relative movement with respect to the carrier arms in the horizontal direction. Other structural measures and embodiments of the at least one crossmember that ensure that the at least one crossmember has the necessary flexibility upon partial vertical deflection of the side section are also feasible.

Alternatively, a large number of crossmembers can be provided, each of which interconnects at least two adjacent carrier arms. The individual crossmembers can be aligned in the longitudinal direction of the side section, or they can be offset one behind the other across the width of the side section. To attain the flexibility for a horizontal compensatory movement, the large number of crossmembers are also designed in the manner described above for the continuous crossmembers.

Preferably, the supporting arms can include means for reducing the weight exerted by the cutter bar on the ground. A large number of header skid shoes are mounted on the cutter bar, downstream of the cutter bar on the side of the header facing the ground, which sense the ground in order to follow the course thereof. The course of the ground is transmitted by the header skid shoes to the cutter bar which follows the course via corresponding vertical compensatory movements. The means for reducing the weight can be in the form of springs or hydraulic cylinders, for example, and serve to reduce the weight applied to the ground via the header skid shoes, which are used to sense and follow the ground, to prevent the cutter bar from pushing soil in front of it.

In particular, the supporting arms and the at least one supporting element can be interconnected via at least one sliding joint. As a result, relative movement between the supporting arms and the at least one supporting element is attained, and the sliding joint is also used for the mutual guidance of the supporting arm and the at least one supporting element.

Furthermore, the middle section can include a header auger and a floor plate comprising a guide element disposed thereon, wherein the floor plate is pivotably mounted on the base frame. The floor plate, which is pivotably mounted on the base frame, results in a flatter design of the header and, therefore, a better flow of crop material without losses. The guide element located on the floor plate makes it possible—in combination with the header auger—to draw in the crop in a direct, forced manner, whereby the middle section is also suited for high crop quantities.

Alternatively, the middle section can comprise an intake device which is in the form of a feed belt and conveys the crop transversely to the conveyance direction of the side belts.

As an advantage, the pivot axis of the supporting arm can be disposed axially parallel to the pivot axis of at least one supporting element. Compared to a coaxial arrangement of the pivot axes, the axially parallel configuration has the advantage that the position of the pivot axis of the supporting arm carrying the cutter bar having low clearance from the ground can be selected, and therefore the line of force between the cutter bar and the pivot axis extends in the flattest angle possible relative to the ground. In respect to the position of the pivot axis of the supporting element, the advantage results that the pivot axis is located at a slight distance behind the conveyor device, and therefore the belt moves only slightly on the side thereof facing the base frame when undergoing a compensatory motion, whereby the belt guidance is improved considerably and a horizontal deflection of the belt that could occur upon vertical deflection of the supporting element is largely prevented.

In particular, in order to guide the belt, the at least one supporting element can comprise a groove which extends axially parallel to the base frame, into which a circumferential projection on the inner side of the belt having a shape corresponding to that of the groove engages.

Preferably, the groove can be disposed directly adjacent to the upper pivot axis. This configuration has the advantage that, upon vertical deflection of at least one of the supporting elements, the horizontal position of the belt changes only slightly on the side thereof facing the base frame, whereby the stability of the largely form-fit guidance is not impaired by the groove in the at least one supporting element and the projection on the belt.

To improve the guidance, the groove can extend approximately without interruption across the width of the particular side section.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
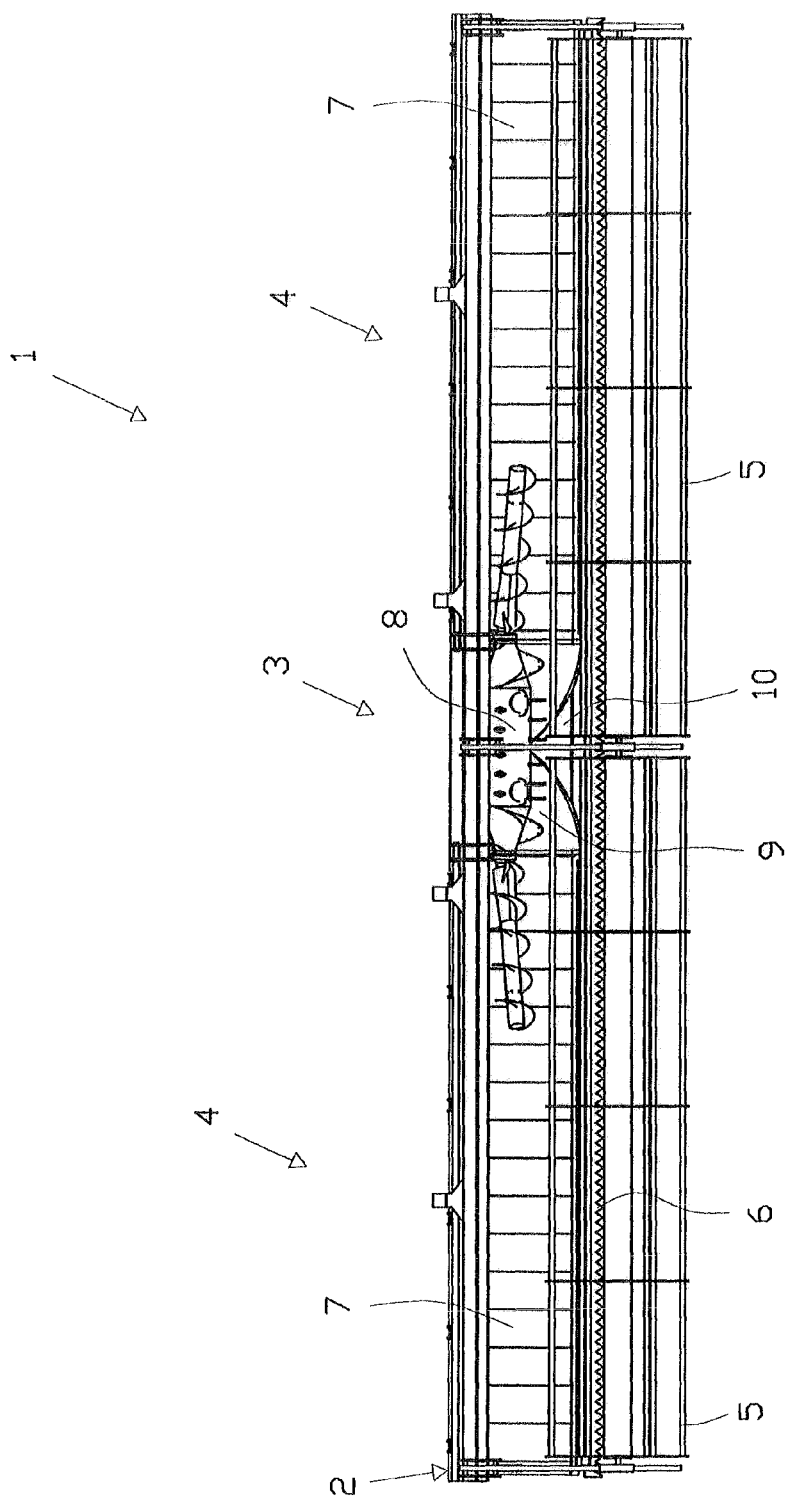
FIG. 1 shows a view of a schematically depicted header from above.

FIG. 1 shows a schematic view of a header 1 from above. Header 1 comprises a base frame 2 on which a middle section 3 and at least two side sections 4 adjacent to middle section 3 are disposed. A continuous, flexible cutter bar 6 which extends across approximately the entire width of header 1 is disposed on middle section 3 and side sections 4 on the front side of header 1 opposite base frame 2. Reels 5 are disposed on base frame 2 of header 1, which extend across the width of one side section 4 and across part of the width of middle section 3. Reels 5 serve to improve the take-up of the crop by cutter bar. The crop that is cut by cutter bar 6 is supplied to a conveyor device which is disposed downstream of cutter bar 6 and is in the form of at least one endlessly circulating belt 7 on respective side sections 4.

Endlessly circulating belts 7 are disposed adjacent to middle section 3 in order to transport the crop cut by cutter bar 6 parallel to the longitudinal axis of header 1 in the direction of middle section 3, and to supply same to an intake device. Middle section 3 comprises an intake device which is in the form of driveable header auger 8 and supplies the crop delivered by endless belts 7 laterally to middle section 3 to an opening provided in base frame 2 and disposed downstream of header auger 8, through which the crop is transferred via a feeder housing located on a combine harvester, which is not depicted, to the combine harvester for further processing.

Middle section 3 comprises a floor plate 9 which has a contoured design on the top side thereof facing header auger 8, which is disposed above floor plate 9, while the diametrically opposed underside of floor plate 9 is largely planar. The contoured top side of floor plate 9 comprises a wedge-shaped, raised projection 10. Projection 10 tapers from the front edge of header 1 in the direction of header auger 8, and terminates in a tip facing header auger 8. Projection 10 serves to forcibly redirect material in order to redirect the crop delivered by belts 7 into the intake region of header auger 8. The height of projection 10 can vary in order to ensure that material is sufficiently deflected. As a result, the cut crop that is supplied laterally to middle section 3 via belts 7 of side sections 4 is forcibly deflected in the direction of header auger 8 in order to improve material take-up.

Figure 2:
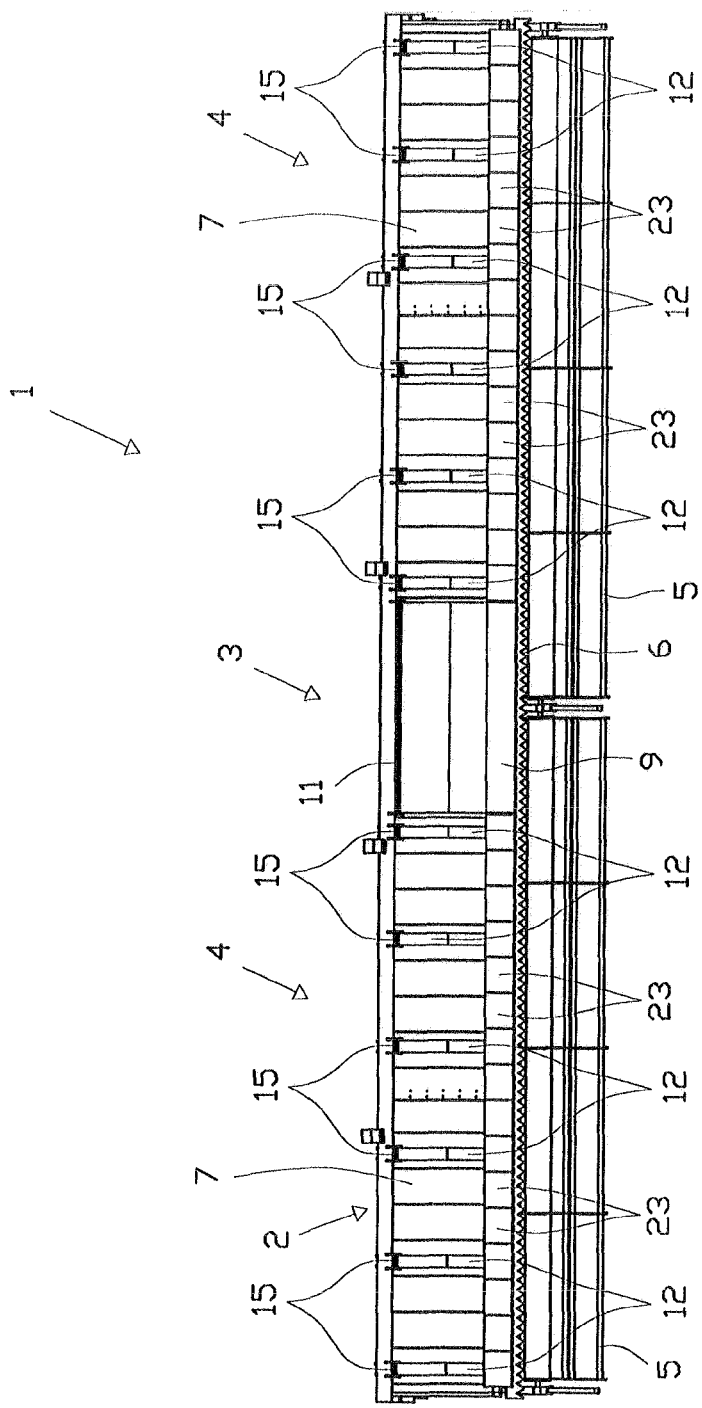
FIG. 2 shows a view of the header according to FIG. 1, from below.

The depiction in FIG. 2 shows header 1 according to FIG. 1 in a view from below. Contoured floor plate 9 is largely planar on the underside thereof. Floor plate 9 is hinge-mounted on base frame 2 such that it can swivel about an axis 11 that is axially parallel to the longitudinal axis of header 1, and therefore floor plate 9 can be deflected in the vertical direction only across the entire width thereof. The depiction in FIG. 2 furthermore shows that side sections 4 comprise a large number of supporting arms 12 which are pivotably hinge-mounted on base frame 2, and which carry cutter bar 6 on their ends facing away from base frame 2. A large number of header skid shoes 23 which sense the ground and therefore follow the course of the ground are disposed on respective side sections 4 parallel to cutter bar 6. Via header skid shoes 23, ground contours are sensed and transmitted to cutter bar 6 which undergoes a deflection in the vertical direction, at least in sections, due to the pivotable deflection of supporting arms 12 on base frame 2, in order to follow the course of the ground contours.

According to the invention, supporting arms 12 of particular side section 4 carry cutter bar 6, while endless belts 7 of side sections 4 are carried by at least one additional supporting element 13, and therefore cutter bar 6 can move independently of endless belts 7 of corresponding side section 4. By decoupling the functions of cutter bar 6 being carried by supporting arms 12, and of the conveyor device—which is in the form of belts 7—being carried on side sections 4 by the at least one supporting element 13, the guidance of belt 7 remains largely unimpaired in this region when one or more adjacent supporting arms 12 undergo vertical deflection since supporting element 13 can move relative to supporting arms 12.

Figure 3:
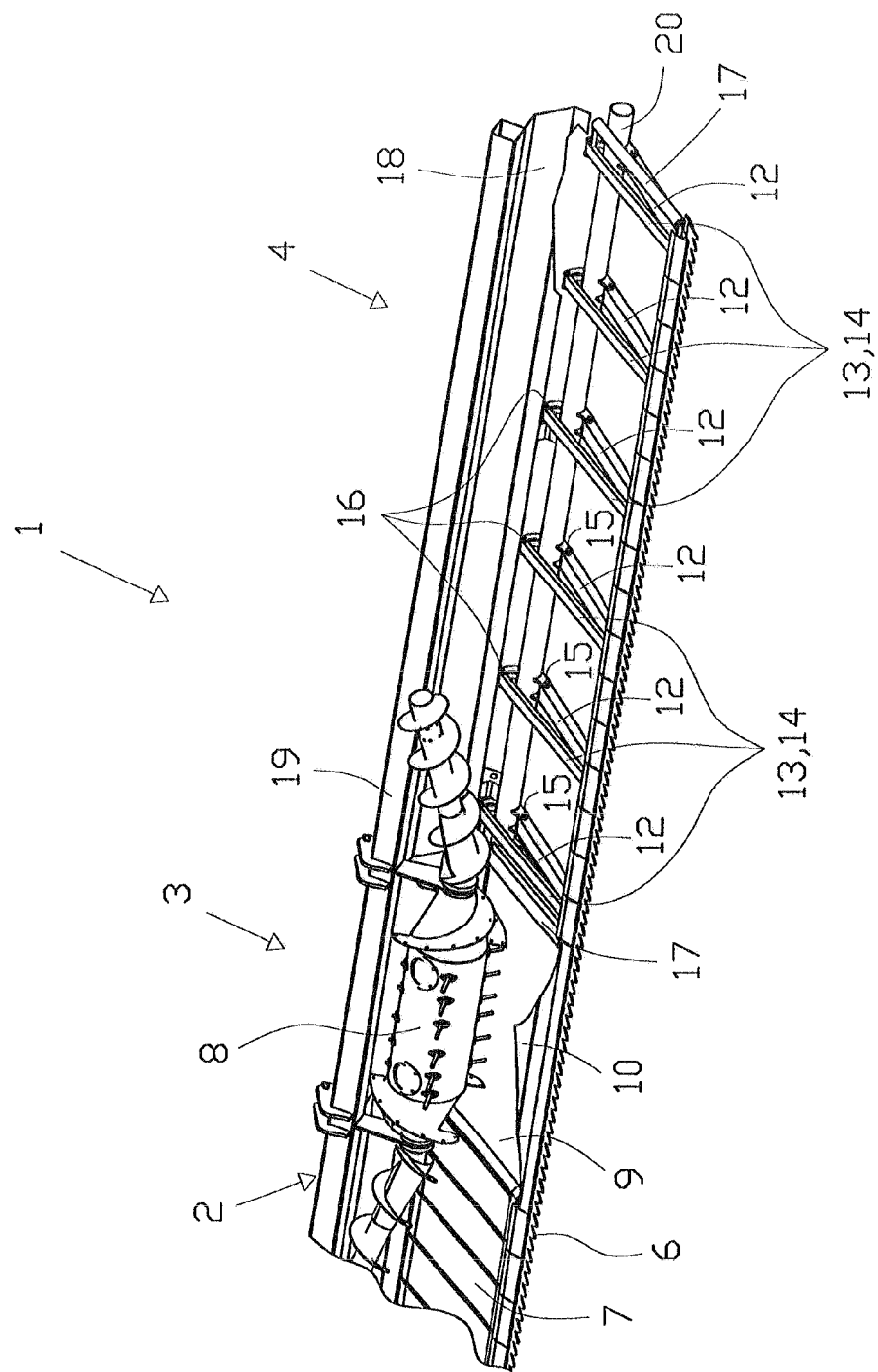
FIG. 3 shows a perspective view of the header according to FIG. 1, in a first embodiment.

The depiction in FIG. 3 shows a perspective view of header 1 according to FIG. 1 in a first embodiment. In the depiction according to FIG. 3, a side section 4 of header 1 is partially exposed in order to show the structure of header 1 located underneath belt 7. As shown in FIG. 3, base frame 2 comprises a rear panel 18 which extends vertically relative to the direction of motion of belts 7, and which is enclosed between two preferably hollow-cylindrical profiled elements 19, 20. In middle section 3, driveable header auger 8 is retained on profiled elements 19, 20 of base frame 2.

In the first embodiment of header 1 according to the invention, as shown in FIG. 3, supporting element 13 is in the form of a large number of separate carrier arms 14. Carrier arms 14 are disposed in pairs parallel to supporting arms 12, preferably directly above them and in alignment therewith in the vertical direction. Supporting arms 12, which are disposed in pairs, and carrying arms 14 are hinge-mounted to base frame 2 such that they can pivot about a separate lower pivot axis 15 and an upper pivot axis 16. Lower pivot axis 15 and upper pivot axis 16 are disposed on the base frame at a distance from each other. Upper pivot axis 16 is disposed directly adjacent to belt 7. Actively driven or passive guide rollers 17 which drive or guide, respectively, the particular endlessly circulating belt 7 of a side section 4 are disposed at least on carrier arms 14 disposed on the ends of side sections 4. Particular belt 7 of a side section 4 only encloses carrier arms 14, and therefore a vertical deflection of one or more supporting arms 12 about lower pivot axis 15 largely does not affect the guidance of belt 7 which extends parallel thereto and is carried by carrier arms 14 which can be swivelled about upper pivot axis 16. The configuration of upper pivot axis and lower pivot axis 15, 16 is selected such that they both lie substantially in a plane with belt 7 and the cutter bar, respectively.

Figure 4:
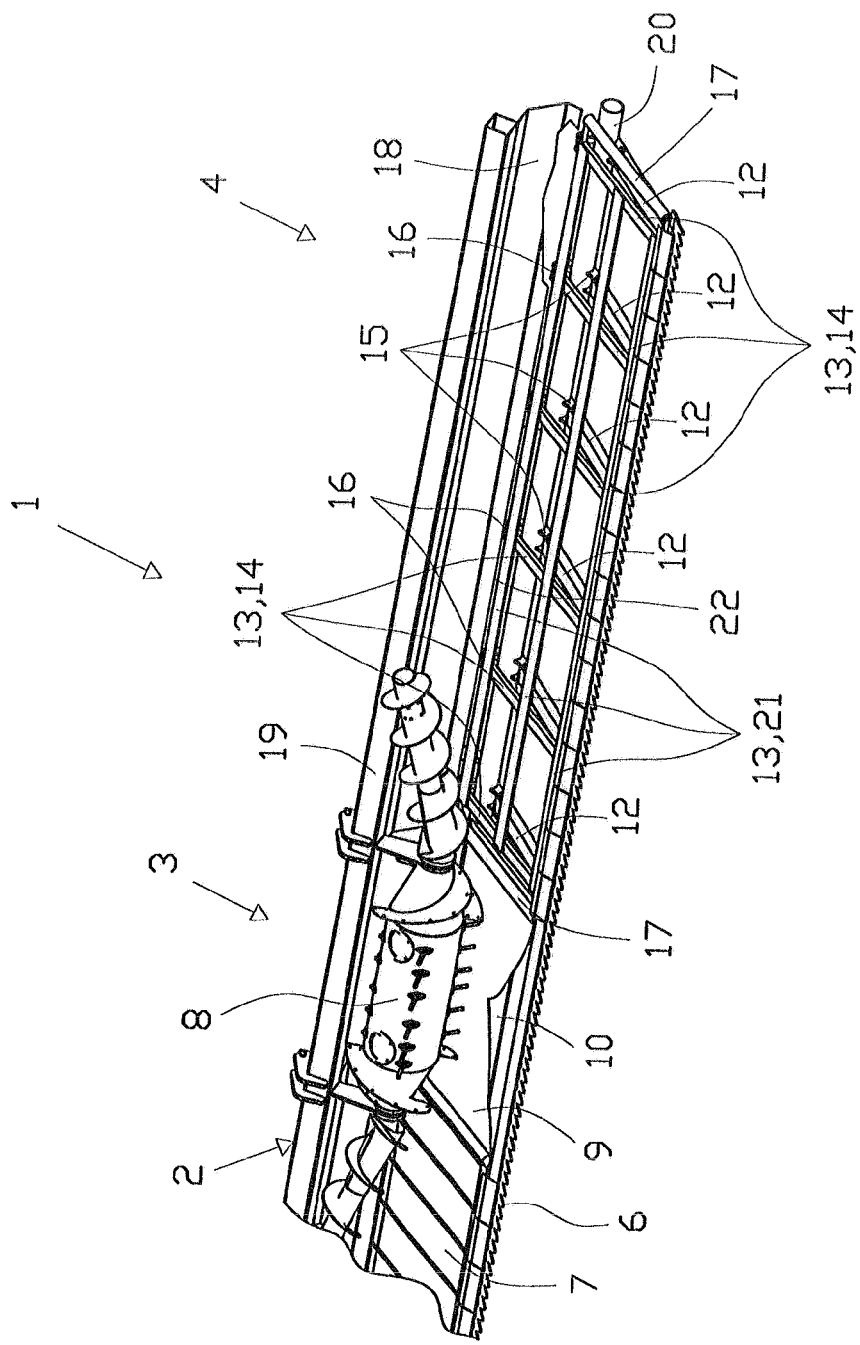
FIG. 4 shows a perspective view of the header according to FIG. 1, in a second embodiment.

FIG. 4 shows a perspective view of a header 1 according to FIG. 1, in a second embodiment. This embodiment differs from that shown in FIG. 3 in that the at least one supporting element 13 is in the form of a framework. To this end, carrier arms 14 of one side section 4 are interconnected by at least one crossmember 21 which extends substantially across the entire width of side section 4 of header 1. In the embodiment shown, a plurality of crossmembers 21 are disposed in parallel on carrier arms 14 of side section 4 and form a type of table that carries belt 7, and on which belt 7 lies with a large surface area, thereby resulting in continuous contact of belt 7 on framework-type supporting element 13. Belt 7 is guided via a continuous groove 22 which is disposed directly adjacent upper pivot axis 16 on crossmember 21. A circumferential projection having a shape corresponding to that of groove 22 and disposed on the inner side of belt 7 facing carrier arms 14 engages in continuous groove 22.

Figure 5:
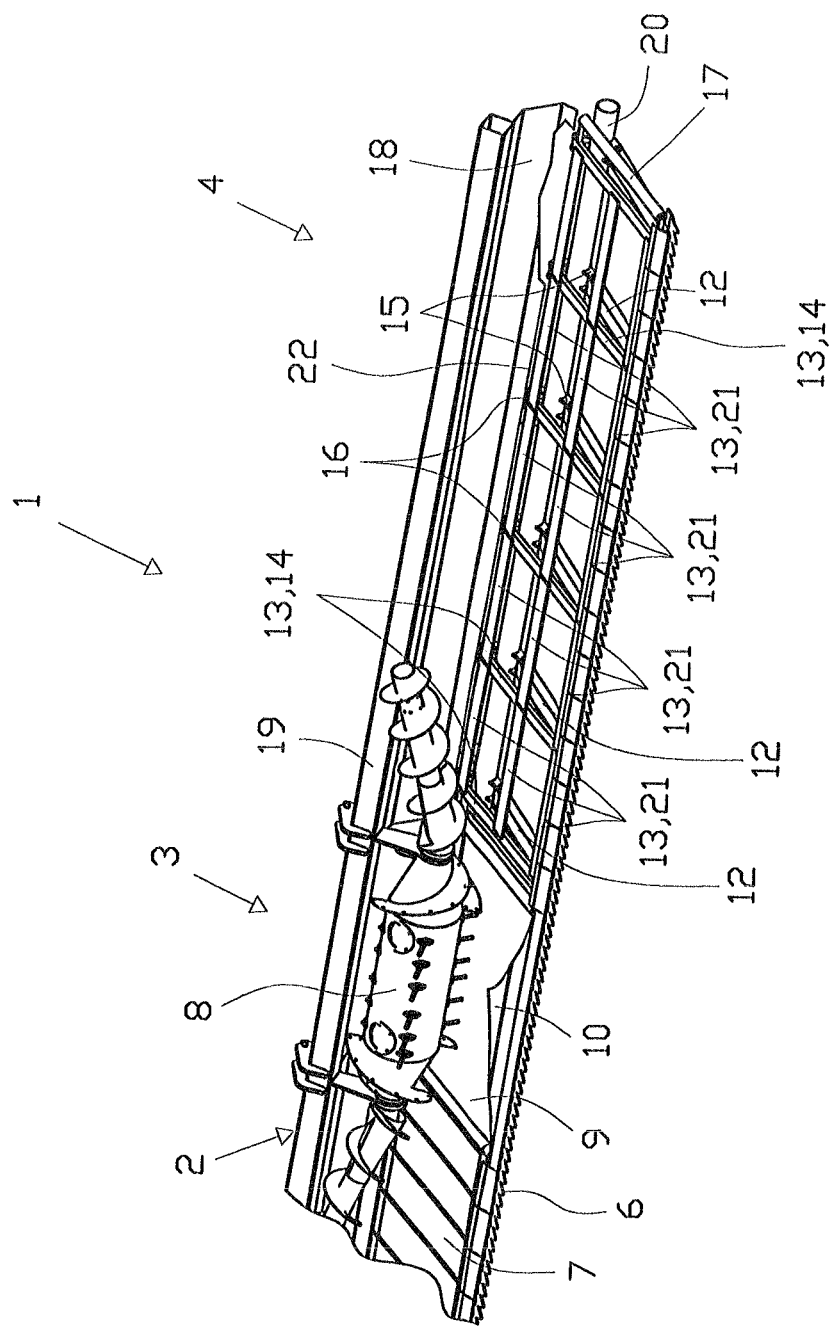
FIG. 5 shows a perspective view of the header according to FIG. 1, in a third embodiment.

FIG. 5 shows a perspective view of header 1 according to FIG. 1, in a third embodiment. In this embodiment, a plurality of crossmembers 21 disposed axially parallel to base frame 2 are provided, wherein one crossmember 21 interconnects at least two adjacent carrier arms 14 in each case. Individual crossmembers 21 are preferably disposed one behind the other in a row, thereby resulting in a configuration with a continuous crossmember 21 that corresponds to the second embodiment. Likewise, individual crossmembers 21 are offset relative to one another as seen in the longitudinal direction of header 1. Belt 7 is guided in a manner described with reference to the second embodiment. A large number of crossmembers 21 are aligned, one behind the other, parallel to upper pivot axis 16. Crossmembers 21 each comprise a groove 22 which, due to the aligned configuration of crossmembers 21, form one continuous groove 22 which is approximately free of interruptions, as in the first embodiment. The continuous design of groove 22 simplifies the guidance of belt 7.

A feature common to all of the embodiments is that lower pivot axis 15 of supporting arm 12 is disposed axially parallel to upper pivot axis 16 of the at least one supporting element 13. Compared to a coaxial arrangement of pivot axes 15, 16, the axially parallel configuration has the advantage that the position of lower pivot axis 15 of supporting arm 12 carrying cutter bar 6 can be selected to have low clearance from the ground, and therefore the line of force between cutter bar 6 and lower pivot axis 15 extends in a flat angle relative to the ground. In respect to the position of upper pivot axis 16 of supporting element 13, the advantage results that upper pivot axis 16 is located at a slight distance behind the conveyor device, which is in the form of belt 7, and therefore belt 7 moves only slightly in the horizontal direction on the side thereof facing base frame 2 when undergoing a compensatory movement, whereby the guidance of belt 7 in a groove 22—which extends axially parallel to upper pivot axis 16 and is directly adjacent thereto—is improved considerably.

It will be understood that each of the elements described above, or two or more together, may also find a useful application in other types of constructions differing from the types described above.

While the invention has been illustrated and described as embodied in a header, is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A header, comprising:
   a base frame;
   a middle section disposed on said base frame;
   at least two side sections disposed adjacent said middle section a flexible finger bar; and
   at least one conveyor device located downstream of said finger bar and formed on a respective one of said side sections as an endless belt disposed adjacent said middle section to transport crop cut by said finger bar parallel to a longitudinal axis of the header in a direction of said middle section, wherein said side sections have a plurality of supporting arms which are pivotably mounted on said base frame, wherein said supporting arms of a respective one of said side sections carry said finger bar, and at least one supporting element is provided and carries said belt, thereby enabling said belt and said finger bar to move independently of one another, and wherein said supporting arms and said at least one supporting element are positioned so that a position of a lower pivot axis of said supporting arms is independent of a position of a upper pivot axis of said at least one supporting element.

2. The header as defined in claim 1, wherein said supporting arms and said at least one supporting element are each hinge-mounted on said base frame such that they are pivotable about separate pivot axes.

3. The header as defined in claim 1, wherein said at least one supporting element is formed by a plurality of carrier arms which are disposed parallel to said supporting arms carrying said finger bar.

4. The header as defined in claim 3, wherein said at least one supporting element is formed as a framework.

5. The header as defined in claim 4, further comprising at least one crossmember which interconnects at least two of said carrier arms of one of said side sections.

6. The header as defined in claim 4, further comprising a plurality of crossmembers each interconnecting at least two adjacent ones of said carrier arms.

7. The header as defined in claim 1, wherein said supporting arms include means for reducing a weight exerted by said finger arm on a ground.

8. The header as defined in claim 1, wherein said middle section has a header auger and a track shoe having a guide element disposed thereon, wherein said track shoe is pivotably mounted on said base frame.

9. The header as defined in claim 1, wherein said middle section has an intake device formed as a feed belt.

10. The header as defined in claim 1, wherein said at least one supporting element has a groove extending axially parallel to said base frame, and wherein said belt has an inner side provided with a circumferential projection having a shape corresponding to a shape of said groove and engaging in said groove.

11. The header as defined in claim 10, wherein said groove is disposed directly adjacent to said upper pivot axis.

12. The header as defined in claim 11, wherein said groove extends substantially without interruption across a width of a respective one of said side sections.

* * * * *